(12) United States Patent
Francisco

(10) Patent No.: US 12,732,663 B2
(45) **Date of Patent: *Sep. 8, 2026**

(54) REMOTE USER INTERFACE

(71) Applicant: Comcast Cable Communications, LLC, Philadelphia, PA (US)

(72) Inventor: Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,229

(22) Filed: Apr. 12, 2024

(65) Prior Publication Data

US 2024/0284007 A1 Aug. 22, 2024

Related U.S. Application Data

(63) Continuation of application No. 18/168,732, filed on Feb. 14, 2023, now Pat. No. 11,985,386, which is a continuation of application No. 12/767,870, filed on Apr. 27, 2010, now Pat. No. 11,606,615.

(51) Int. Cl.

*H04N 21/47* (2011.01)
*H04N 21/431* (2011.01)
*H04N 21/435* (2011.01)

(52) U.S. Cl.

CPC ......... *H04N 21/47* (2013.01); *H04N 21/4312* (2013.01); *H04N 21/435* (2013.01)

(58) Field of Classification Search

CPC ... H04N 21/47; H04N 21/4312; H04N 21/435
USPC ........... 375/240.26; 348/E7.001, 384.1, 461, 348/E7.026; 715/764
See application file for complete search history.

(56) References Cited

U.S. PATENT DOCUMENTS 5,413,357 A 5/1995 Schulze et al.
5,442,700 A 8/1995 Snell et al.
5,448,568 A 9/1995 Delpuch et al.
5,485,197 A 1/1996 Hoarty
5,495,284 A 2/1996 Katz
(Continued)

FOREIGN PATENT DOCUMENTS

EP 1467558 A2 10/2004
EP 1777950 A2 4/2007
(Continued)

OTHER PUBLICATIONS

European Office Action—EP 11163518.1—Dated Apr. 20, 2015.
(Continued)

*Primary Examiner* — Asmamaw G Tarko
(74) *Attorney, Agent, or Firm* — Banner & Witcoff, Ltd.

(57) ABSTRACT

An interactive user interface, such as a remote terminal user interface, is compressed prior to transmission to a video client. The compression may be performed independently of any other video that may be simultaneously transmitted to the video client. At the client side, two compressed video streams (remote user interface and video content) may be decompressed independently of each other. In some cases, technology already existing in some client devices, such as picture-in-picture (PiP) capability, may be leveraged to decompress the received compressed remote user interface without needing to modify the hardware of those client devices.

20 Claims, 4 Drawing Sheets

(56) References Cited

U.S. PATENT DOCUMENTS 5,502,504 A 3/1996 Marshall et al.
5,523,796 A * 6/1996 Marshall .............. H04N 21/482 348/E7.071
5,652,630 A * 7/1997 Bertram ................... H04N 7/16 348/E7.054
5,696,906 A 12/1997 Peters et al.
5,781,245 A 7/1998 Van Der Weij et al.
5,793,410 A 8/1998 Rao
5,818,438 A 10/1998 Howe et al.
5,828,421 A 10/1998 Boyce et al.
5,844,620 A * 12/1998 Coleman ............ H04N 21/2362 348/E7.054
5,850,352 A 12/1998 Moezzi et al.
6,044,396 A 3/2000 Adams
6,295,646 B1 * 9/2001 Goldschmidt Iki .. H04N 21/482 725/43
6,351,270 B1 * 2/2002 Nishikawa ....... H04N 21/64322 348/E5.103
6,415,437 B1 7/2002 Ludvig et al.
6,419,137 B1 * 7/2002 Marshall ............ H04N 7/17318 348/E7.071
6,493,038 B1 * 12/2002 Singh ................... H04N 21/482 348/565
6,505,348 B1 * 1/2003 Knowles ............ H04N 21/4755 348/E5.103
6,539,545 B1 3/2003 Dureau et al.
6,563,515 B1 * 5/2003 Reynolds ............... H04N 21/47 725/39
6,584,153 B1 6/2003 Gordon et al.
6,661,426 B1 * 12/2003 Jetha .................. H04N 21/4312 715/768
6,754,905 B2 6/2004 Gordon et al.
6,909,451 B1 * 6/2005 Latypov ............. H04N 21/4788 348/14.07
7,032,176 B2 4/2006 Gordon et al.
7,117,440 B2 10/2006 Gordon et al.
7,143,428 B1 * 11/2006 Bruck ................ H04N 21/6175 709/204
7,260,147 B2 8/2007 Gordon et al.
7,634,788 B2 12/2009 Gordon et al.
7,664,872 B2 2/2010 Osborne et al.
7,757,253 B2 * 7/2010 Rappaport ........... H04N 21/482 725/56
8,601,502 B2 12/2013 Higgins et al.
9,351,032 B2 * 5/2016 Briggs ............... H04N 21/4725
11,606,615 B2 3/2023 Francisco
2001/0012022 A1 * 8/2001 Smith ................... G06F 3/0481 715/768
2002/0013941 A1 * 1/2002 Ward, III ........... H04N 21/4755 345/38
2002/0026637 A1 2/2002 Markel et al.
2002/0049975 A1 4/2002 Thomas et al.
2003/0028879 A1 * 2/2003 Gordon ............ H04N 21/47205 725/39
2003/0084460 A1 5/2003 Chung et al.
2004/0133910 A1 7/2004 Gordon et al.
2004/0201780 A1 10/2004 Kim
2004/0210931 A1 10/2004 Gordon et al.
2005/0066278 A1 * 3/2005 Sloo ................... H04N 5/44504 348/E7.054
2005/0071782 A1 3/2005 Barrett et al.
2005/0132420 A1 6/2005 Howard et al.
2005/0193337 A1 * 9/2005 Noguchi .............. H04N 21/482 725/39
2005/0278648 A1 * 12/2005 Taylor ................ H04N 5/44504 725/38
2006/0036963 A1 * 2/2006 Taylor ................ H04N 5/44504 725/38
2006/0117371 A1 6/2006 Margulis
2006/0168291 A1 7/2006 van Zoest et al.
2006/0174026 A1 8/2006 Robinson et al.
2006/0195884 A1 8/2006 van Zoest et al.
2007/0060259 A1 * 3/2007 Pececnik ............. G07F 17/3223 463/16
2007/0094610 A1 4/2007 Pak et al.
2008/0120675 A1 5/2008 Morad et al.
2008/0244653 A1 * 10/2008 Marshall ................ H04N 21/47 725/40
2008/0267589 A1 10/2008 Turner et al.
2009/0010609 A1 1/2009 Hsieh
2009/0135916 A1 5/2009 Lee
2010/0017717 A1 * 1/2010 Nakanishi .......... H04N 21/6581 715/719
2010/0208082 A1 * 8/2010 Buchner ............ H04N 21/4788 348/739
2010/0275143 A1 10/2010 Fu et al.
2010/0306688 A1 12/2010 Cho et al.
2010/0323762 A1 12/2010 Sindhu
2011/0132172 A1 * 6/2011 Gueneux .................. G10G 1/00 84/453
2012/0084662 A1 4/2012 Navarro et al.

FOREIGN PATENT DOCUMENTS

WO 2006074110 A2 7/2006
WO 2007036816 A2 4/2007

OTHER PUBLICATIONS

Response to European Office Action—EP Appl. 11163518.1—submitted Oct. 9, 2015.
Mar. 13, 2017—Canadian Office Action—CA 2,737,842.
European Summons to Oral Proceedings—EP 11163518.1—Dated Apr. 19, 2017.
Hewlett-Packard Company: "HP Media Center PC User's Guide", User Guide Hewlett Packard, Jan. 1, 2003, pp. 1-232.
Apr. 20, 2018—European Decision to Refuse—EP 11163518.1.

* cited by examiner

REMOTE USER INTERFACE

CROSS-REFERENCE TO RELATED APPLICATIONS

This application is a continuation of and claims priority to U.S. patent application Ser. No. 18/168,732, filed Feb. 14, 2023, which is a continuation of U.S. patent application Ser. No. 12/767,870, filed Apr. 27, 2010 (now U.S. Pat. No. 11,606,615), each of which is hereby incorporated by reference in its entirety.

BACKGROUND

Remote user interfaces are commonly used by a first device to interact with a second device. The remote user interface is typically generated by the second device and sent to the first device to be presented to the user. Such remote user interface implementations generally fall into two categories: protocol-specific and remote terminal.

Protocol-specific remote user interfaces may be highly optimized for a specific application, network, and client architecture. While protocol-specific remote user interfaces can be bandwidth efficient and can support dynamic user interfaces as a practical matter, they are typically limited to servicing very specific client devices rather than standardized client devices.

Remote terminal user interfaces typically transfer the entire video frame buffer from the second device to the first device for remote rendering. Compared with the protocol-specific remote user interface, this type of remote interface uses a lower complexity mechanism and is more flexible as to client device type. However, remote terminal interfaces have thus far been generally limited as a practical matter to static displays, due to the relatively high bandwidth needed to send the video frames of dynamic user interfaces.

SUMMARY

Aspects as described herein are directed to making interactive user interfaces such as remote terminal user interfaces more bandwidth efficient. For example, the interactive user interface may include video that is compressed prior to transmission to the video client. Such compression may reduce the amount of bandwidth needed to transmit the interactive user interface, thereby potentially allowing the interactive user interface to be more detailed and/or more dynamic, even to the point of being pixel-accurate from generation to viewing.

According to some aspects, the compression may be performed independently of any other video that may be simultaneously transmitted to the video client. At the client side, these two compressed video streams (remote user interface and video content) may be decompressed independently of each other. In some cases, technology already existing in some client devices, such as picture-in-picture (PiP) capability, may be leveraged to decompress the received compressed remote user interface without needing to modify the hardware of those client devices.

In addition, because positioning and scaling of the displayed interactive user interface may be performed by the video client rather than the device generating the interactive user interface (e.g., a residential gateway or television content provider), this may potentially reduce the workload of the residential gateway or provider's system. For instance, the residential gateway or provider's system may no longer need to send different customized versions of the interactive user interface to different viewing client devices depending upon the client device capabilities.

Therefore, some aspects are directed to an apparatus, system, software, and method that may involve or perform the following: receiving first data representing compressed video content, receiving second data representing a compressed interactive user interface, decompressing the compressed video content, decompressing the compressed interactive user interface separately from the compressed video content, and generating a video signal that includes both the decompressed video content and the decompressed interactive user interface.

Still further aspects are directed to an apparatus, comprising a network interface configured to receive from a network first data representing a compressed interactive user interface and second data representing video content, a decoder configured to decompress the compressed interactive user interface and to decompress the compressed video content, and a combiner configured to generate a video signal combining the decompressed interactive user interface with the decompressed video content.

Still further aspects are directed to an apparatus, system, software, and method that may involve or perform the following: receiving first data representing video content, generating second data representing an interactive user interface, compressing the interactive user interface, and sending third data representing the video content and fourth data representing the compressed interactive user interface Yet further aspects are directed to an apparatus, comprising a program tuner configured to receive first data representing video content, a processor configured to generate second data representing an interactive user interface, a compressor configured to compress the interactive user interface, and a network interface configured to send third data representing the video content and fourth data representing the compressed interactive user interface.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
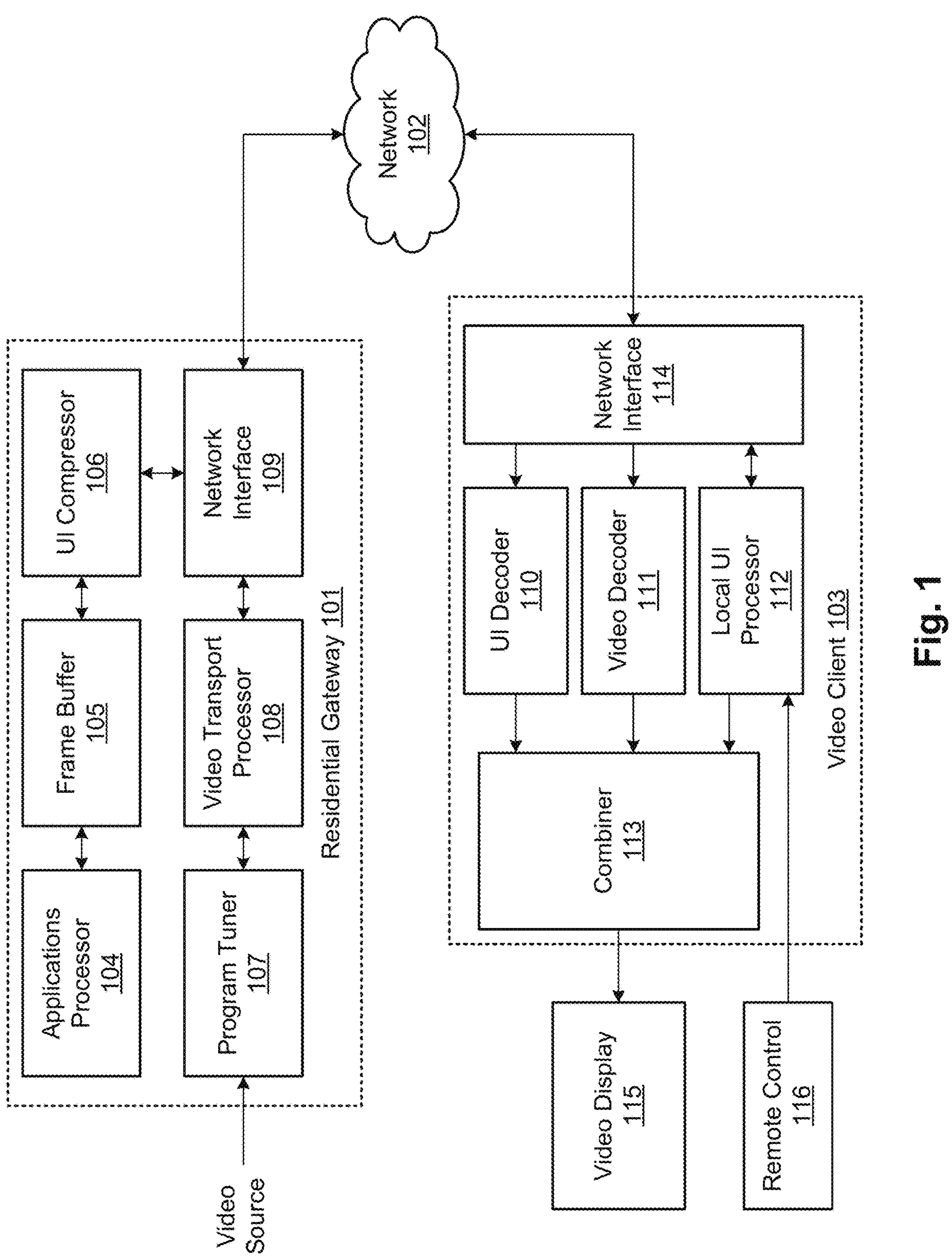
FIG. 1 is a functional block diagram of an illustrative system comprising a residential gateway and a video client.

FIG. 1 is a functional block diagram of an illustrative system in which a residential gateway 101 and a video client 103 are communicatively connected via a network 102. While a residential gateway and a video client are shown in this example, residential gateway 101 may be replaced with any type of device capable of forwarding an interactive user interface to a video client. Likewise, video client 103 may be any type of device capable of receiving and causing the interactive user interface to be displayed to a user, and potentially also allowing the user to interact with the interactive user interface. Thus, the concepts described herein are not limited to interactions between a residential gateway and a video client.

Residential gateway 101 includes, in this example, an applications processor 104, a frame buffer 105, a user interface (UI) compressor 106, a program tuner 107, a video transport processor 108, and a network interface 109. Video client 103 includes, in this example, a UI decoder 110, a video decoder 111, a local UI processor 112, a combiner 113, and a network interface 114. Video client 103 may further include and/or otherwise be communicatively coupled to (e.g., via wire or wirelessly), a video display 115 and a remote control 116.

While various separate functional blocks are shown in FIG. 1, two or more of these functional blocks may or may not be physically combined together into a single physical unit. Moreover, one or more of these functional blocks may be sub-divided into multiple physical units. In other words, the functional block division as shown in FIG. 1 may either correspond to or be independent of the physical implementation of the functional blocks. For example, UI decoder 110 and video decoder 111 may utilize physically separate decoder circuitry or may utilize the same physical decoder circuitry. Or, UI decoder 110 and video decoder 111 may be separate software code or share the same or utilize overlapping software code. Each of residential gateway 101 and video client 103 may also include additional functional blocks not shown in FIG. 1. As another example, video client 103 may be physically integrated with or separate from video display 115.

Residential gateway 101 and video client 103 may each be implemented, for example, as a computer. The term "computer" as referred to herein broadly refers to any electronic, electro-optical, and/or mechanical device, or system of multiple physically separate such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software to perform specific functions. The software, if any, may be stored on a computer-readable medium in the form of computer-readable instructions. A computer may read those computer-readable instructions, and in response perform various steps as defined by those computer-readable instructions. Thus, any functions attributed to residential gateway 101 and video client 103 as described herein may be implemented, for example, by reading and executing such computer-readable instructions for performing those functions, and/or by any hardware subsystem (e.g., a processor) from which the computer is composed. Additionally, or alternatively, any of the above-mentioned functions may be implemented by the hardware of the computer, with or without the execution of software. For example, the computer may be or include an application-specific integrated circuit (ASIC), field-programmable gate array (FPGA), or other type of circuitry that is configured to perform some or all of the functions attributed to the computer. In such embodiments, the processor may be implemented as or otherwise include the ASIC, FPGA, or other type of circuitry.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives.

Such a computer-readable medium may store computer-readable instructions (e.g., software) and/or computer-readable data (i.e., information that may or may not be executable). In the present example, a computer-readable medium (such as memory) may be included in any one or more of blocks 104-109 and 110-114, and may store computer-executable instructions and/or data used by any of those blocks 104-109 and 110-114. Alternatively, or additionally, such a computer-readable medium storing the data and/or software may be physically separate from, yet accessible by, residential gateway 101 and/or video client 103.

Network 102 may serve to communicatively couple residential gateway 101 and video client 103 together, and may be any type of network or combination of networks. Examples of network 102 include, but are not limited to, the Internet, an intranet, a local-area network (LAN), a landline telephone network, a satellite communication network, and a cellular telephone network or other type of wireless network. In other embodiments, residential gateway 101 may be directly coupled to video client 103 without intervening network 102.

Figure 3:
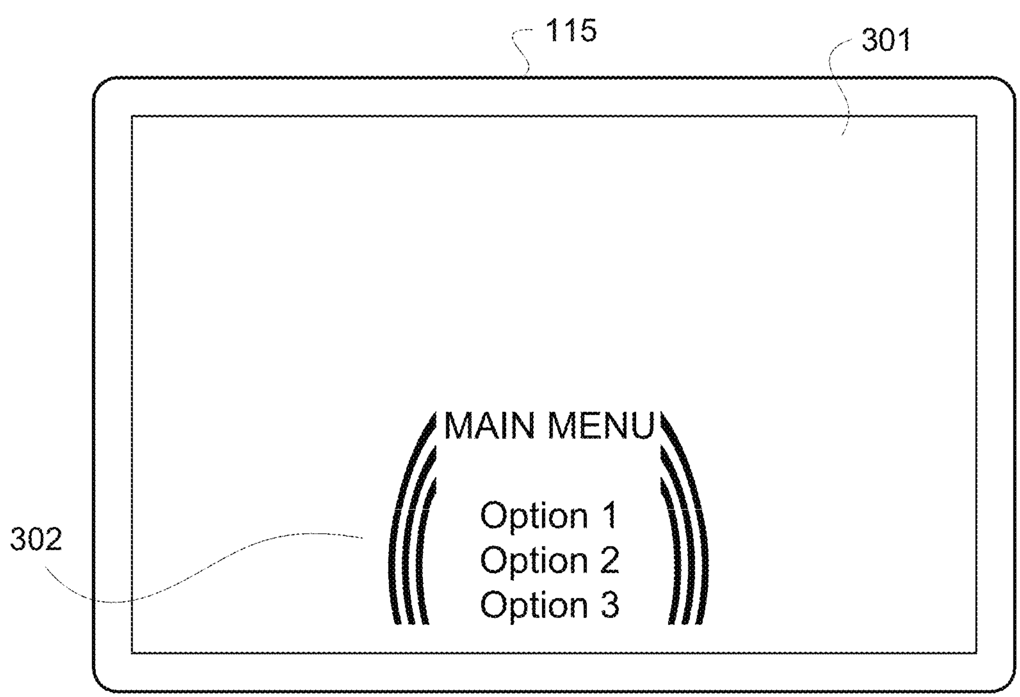
FIG. 3 is an illustrative screen shot of a residential gateway user interface overlaid on video content.

Turning to the functional blocks of residential gateway 101 shown in the example of FIG. 1, applications processor 104 is responsible for generating data representing an interactive user interface that is intended to be viewed by the user of video client 103. Applications processor 104 may generate the user interface based on one or more inputs, which may include input received from video client 103 (e.g., in accordance with commands from the user via remote control 116). This responsiveness to inputs is what makes the user interface interactive. Applications processor 104 may be implemented as one or more physical processors (e.g., a central processing unit, or CPU) and/or other circuitry, and may operate, for example, in accordance with computer-executable instructions stored in a computer-readable medium that will be considered for this example to be part of block 104. However, as discussed above, it is possible that applications processor 104 may operate solely on a hardware basis without the need for executing computer-executable instructions. The generated interactive user interface may include, for example, text and/or graphics, such as shown in element 302 of FIG. 3.

In this example, frame buffer 105 may be configured to receive the data representing the user interface, and for creating and/or storing one or more video frames from that data. Thus, the video frames at this point represent an uncompressed interactive user interface.

UI compressor 106 may be configured to receive the video frames from frame buffer 105 and compressing the video frames to generate a compressed user interface. The compression may be any type of lossy or non-lossy compression, and may be of low complexity or high complexity. However, where lower latency of a highly dynamic interactive user interface is desired, it may be desirable to use a lower complexity compression algorithm. Non-limiting examples of compression that may be used include MPEG (e.g., MPEG-2 and MPEG-4) and VC-1. In addition to existing compression techniques, future as-yet-not-developed compression techniques may also be used. In addition to the above-mentioned compression, UI compressor 106 may reduce the size of the data needed to represent the interactive user interface in other ways, such as by reducing the frame rate and/or the resolution of the interactive user interface.

Regardless of how compression is performed, the data representing the interactive user interface output by UI compressor 106 is compressed relative to the data representing the interactive user interface as received from frame buffer 105. UI compressor 106 may be implemented as a software and/or hardware unit, and may include, for instance, a digital signal processing chip and/or a processor such as a CPU.

Network interface 109 is responsible for some or all communications with network 102. For example, network interface 109 sends the data from UI compressor 106 representing the compressed interactive user interface to network 102 and receives any input commands from video client 103 via network 102. Network interface 109 also sends any video programming content from video transport processor 108 to network 102. Any communications sent to and/or received from network 102 may further be buffered by network interface 109 while waiting for other functions of residential gateway 101 to be ready. Network interface 109 of residential gateway 101 and network interface 114 of video client 103 may also be responsible for negotiating a desired quality of service (QoS) with each other. In addition, the buffering function of network interface 109 may be able to help provide the desired QoS by delaying transmission of the video content and/or interactive user interface over network 102 until a sufficient quantity of either is accumulated in the buffer, thereby smoothing out delays that may occur between the video source and program tuner 107.

Program tuner 107 may be configured to receive desired video content from a video source that may or may not be external to residential gateway 101. The video source may be, for example, a signal received from a television content service provider. In another example, the video source may be a local storage medium (e.g., a hard drive or memory) storing video content, wherein the local storage medium may be part of and/or coupled to residential gateway 101. In fact, such a local video source may be coupled to residential gateway 101 via network 102. Accordingly, program tuner 107 may receive selected video content either directly from the video source (as shown for example in FIG. 1) or from network 102 via network interface 109.

Program tuner 107 may select particular video content from a plurality of different video contents depending upon the format of the video content transmission. For instance, where the video content is digitally received, then program tuner 107 may selectively receive and process only those data packets corresponding to the desired video content. Where different video contents are transmitted over different carrier frequencies, then program tuner 107 may include a frequency tuner for selectively receiving only the desired modulated carrier frequency for the desired video content. The video content as received may already be compressed, such as by MPEG compression. And, where the video content is compressed, the interactive user interface may be compressed by UI compressor 106 using the same compression as the video content, or using a different compression as the video content. For instance, the video content may be compressed using non-lossy compression, and the interactive user interface may be compressed using lossy compression, or vice-versa. Also, any compression used may be a low-latency type of compression, as desired.

Video transport processor 108 may be configured to adapt the video content to be consistent with network-specific protocols, such as but not limited to transport stream requirements, Real-Time Transport Protocol (RTP), Transmission Control Protocol (TCP), and/or multicasting protocols.

Turning to the functional blocks of video client 103 shown in the example of FIG. 1, network interface 114 may be responsible for all communications with network 102. For example, video programming and the compressed interactive user interface from residential gateway 101 may be received by network interface 114. Also, any commands issued by video client 103 (e.g., initiated by a command from remote control 116) may also be sent to residential gateway 101 via network 102 using network interface 114.

UI decoder 110 may be responsible for decompressing the compressed interactive user interface received from network interface 114. The decompression may be of a type that reverses the compression used by UI compressor 106. For example, if the interactive user interface is compressed using MPEG-2, then UI decoder 110 may use an MPEG-2 decoder to decompress the interactive user interface. UI decoder 110 may be implemented as a software and/or hardware unit, and may include, for instance, a digital signal processing chip and/or a processor such as a CPU.

Video decoder 111 may be responsible for decompressing the video content received from network interface 114 (assuming that the video content has been compressed). The decompression may be of a type that reverses the compression by which the video content was previously compressed. For example, if the interactive user interface was compressed using MPEG-2, then video decoder 111 may use an MPEG-2 decoder to decompress the interactive user interface. Video decoder 111 may be implemented as a software and/or hardware unit, and may include, for instance, a digital signal processing chip and/or a processor such as a CPU. Where video client 103 supports picture-in-picture (PiP), picture-in-graphics (PiG), and/or graphics-in-picture (GiP) functionality, then a video client 103 may include dedicated PiP, PiG, and/or GiP decoding circuitry. In that case, video decoder 111 may be implemented as, or otherwise include, the PiP/PiG/GiP decoding circuitry. Also, video decoder 111 and UI decoder 110 may share the same physical decoder circuitry and/or software, and/or may utilize separate decoder circuitry and/or separate software. For example, where video client 103 supports PiP/PiG/GiP functionality, video decoder 111 may utilize the PiP/PiG/GiP decoding circuitry and UI decoder 110 may utilize separate decoding circuitry conventionally used for video decoding.

Figure 4:
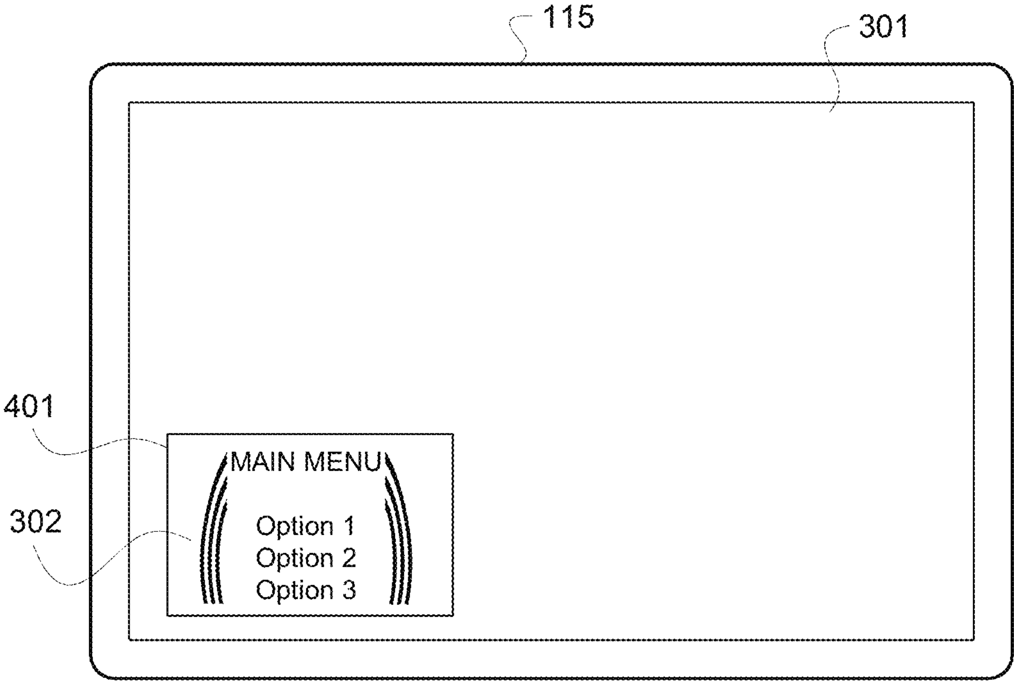
FIG. 4 is an illustrative screen shot of a residential gateway user interface displayed in a picture-in-picture format.
Figure 5:
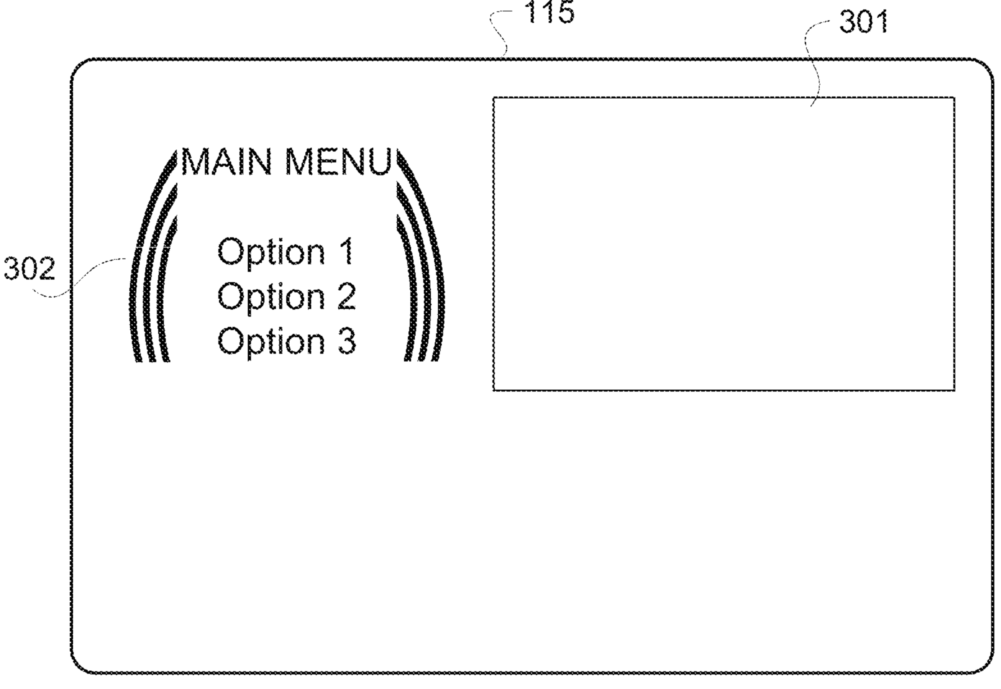
FIG. 5 is an illustrative screen shot of a residential gateway user interface displayed side by side with video content.

Local UI processor 112 may be responsible for determining how the decompressed interactive user interface and/or the decompressed video content is to be displayed on video display 115. For example, local UI processor 112 may determine that the interactive user interface is to be displayed overlaid on top of the video content (as shown by way of example in FIG. 3). Or, local UI processor 112 may determine that the interactive user interface is to be displayed as a PiP, PiG, or GiP window over the video content (as shown by way of example in FIG. 4). Or, local UI processor 112 may determine that the interactive user interface and the video content are to be displayed in different non-overlapping regions of the video frame (as shown by way of example in FIG. 5). The way that local UI processor

112 determines that the interactive user interface and the video content are displayed relative to each other may depend upon, for example, user input, such as via remote control 116, and/or upon a command received via network 102 from residential gateway 101.

Combiner 113 may combine the interactive user interface and the video content into a single video frame signal to be displayed on video display 115 in the manner determined by local UI processor 112. To allow the interactive user interface to be overlaid on top of the video content with or without transparency, combiner 113 may include an alpha blender, for example. In some embodiments, combiner 113 may include or otherwise be implemented as a compositor that combines the video image of the interactive user interface and the video image of the video content.

Figure 2:
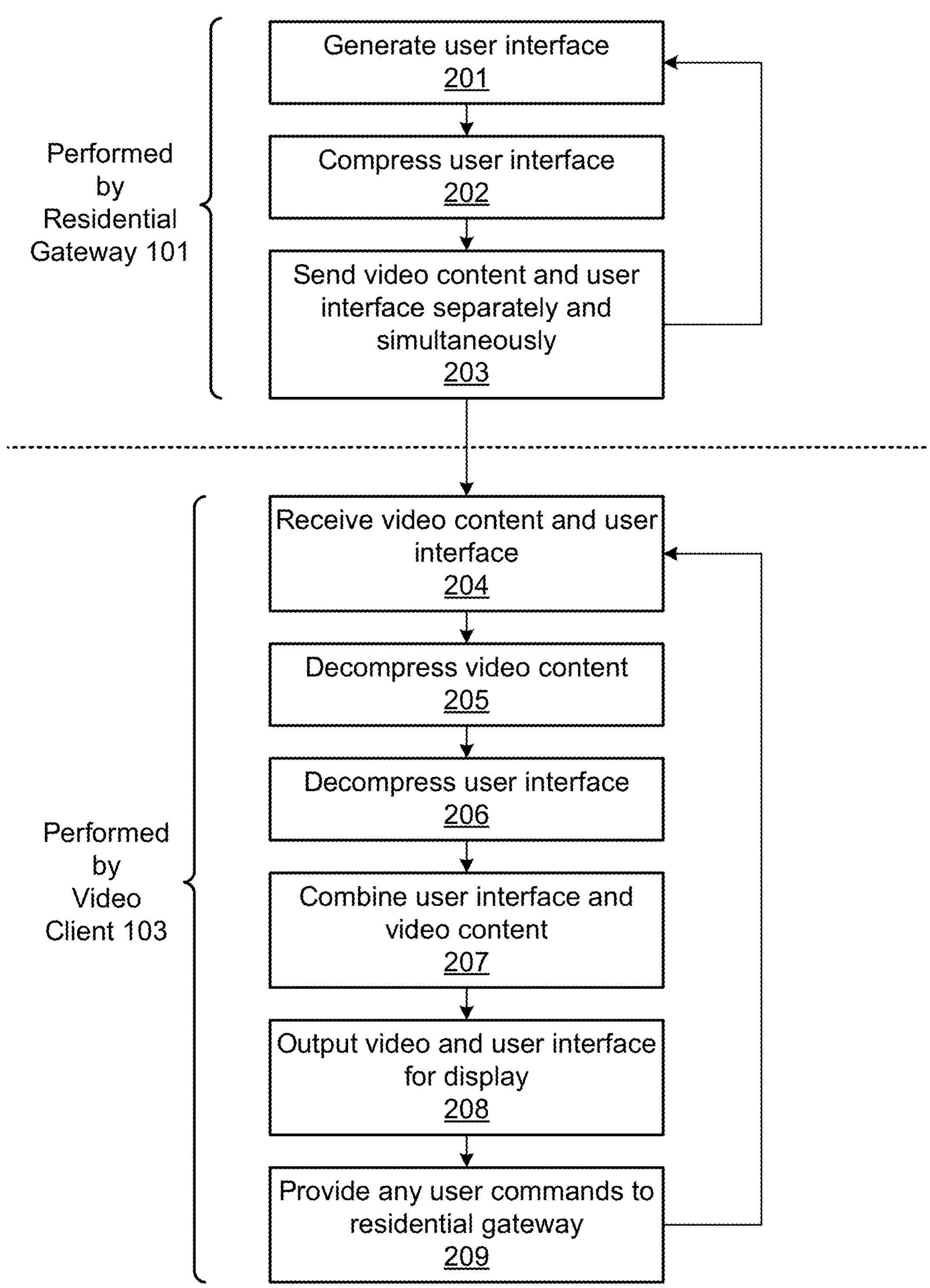
FIG. 2 is a flow chart of an illustrative operation of the system of FIG. 1.

FIG. 2 is a flow chart of an illustrative operation of the system of FIG. 1. Steps 201-203 are performed in this example by residential gateway 101, and steps 204-209 are performed in this example by video client 103. While the various steps are shown sequentially by way of example, this is merely for simplicity of explanation; some of the steps may be performed simultaneously and/or continuously along with others of the steps. Also, the steps performed by residential gateway 101 may be performed simultaneously with the steps performed by video client 103.

In step 201, the interactive user interface may be generated by applications processor 104 in the manner discussed previously, for example. While the interactive user interface is being generated, and/or afterward, frame buffer 105 may buffer and organize the video frames of the interactive user interface and feed them to UI compressor 106. In step 202, UI compressor 106 compresses the interactive user interface.

In step 203, the video content as well as the compressed interactive user interface are received by network interface 109 from program tuner 107 via video transports processor 108, and are sent out over network 102 by network interface 109, for example. The compressed interactive user interface and the video content may be sent separately, even though they may be sent simultaneously. For example, they may be sent as separate data streams each with its own stream identifier in the associated data packets. As another example, the compressed interactive user interface data and the video content data may be sent over network 102 in a time-sliced (multiplexed) manner.

In step 204, the video content and compressed interactive user interface are received from network 102 by network interface 114, and the video content and compressed interactive user interface data may be separated from each other, if needed and depending upon the format in which the video content and compressed interactive user interface are sent. This separation may be performed by network interface 114, video decoder 111, and/or UI decoder 110. Where the video content and compressed interactive user interface data were sent over network 102 in a time-sliced (multiplexed) manner, separation may involve de-multiplexing. In steps 205 and 206, the video content is decompressed by video decoder 111 (if the video content was compressed) and the compressed interactive user interface is decompressed by UI decoder 110, for example. It may be expected that video content decompression and interactive user interface decompression will occur simultaneously, especially where UI decoder 110 and video decoder 111 do not share resources. However, where UI and video decoders 110 and 111 share decompression resources, UI decoder 110 and video decoder 111 may alternate usage of those resources so that the video content and the interactive user interface are effectively decompressed simultaneously.

In step 207, local UI processor 112 and combiner 113 combine the decompressed video content and decompressed interactive user interface into one or more video frames. As previously mentioned, such a combination may include overlaying of the interactive user interface onto (e.g., at least partially overlapping) the video content. This is shown by way of example in FIG. 3, in which video content 301 is displayed simultaneously with interactive user interface 302 overlaid onto (e.g., alpha blended with) underlying video content 301. The location of interactive user interface 302 is shown by way of example near the bottom of the video frame, however, interactive user interface 302 could be located anywhere in the video frame and at any size.

Alternatively, combining may include displaying the interactive user interface in a picture-in-picture layout simultaneously with, and inside or at least partially overlapping, the video content. This is shown by way of example in FIG. 4, in which interactive user interface 302 is displayed in a PiP window 401 (which alternatively could be a PiG or GiP window). The location of PiP window 401 is shown in the lower left quadrant of the video frame, however PiP window 401 could be located anywhere in the video frame, and it could be of any size.

As another possibility, combining may include simultaneously displaying interactive user interface 302 and the video content in different non-overlapping regions of the video frame (e.g., side by side). This is shown by way of example in FIG. 5. In this example, interactive user interface 302 is displayed adjacent the video content 301. However, they could be displayed in any relative configuration, such as one toward the top of the video frame and the other toward the bottom of the video frame. Also, interactive user interface 302 and video content 301 may be displayed at any sizes relative to each other.

The simultaneous display of both the interactive user interface and the video content has been referred to herein. It is to be understood that such simultaneous display includes not only the case where every video frame in a video frame sequence includes both the interactive user interface and the video content, but also the case where they are interleaved so as to provide what appears to be simultaneity to the human eye. For example, video frames might be interleaved to include either the video content or the interactive user interface in an alternating manner. In such a situation using a typical video display frame rate, a human eye could not tell that they are alternating frames, and it would rather appear that the video content and the interactive user interface are being displayed simultaneously.

Moreover, the type and configuration of the combining may be user-selectable (e.g., via remote control 116). Because the interactive user interface is transmitted to video client 103 separately from the video content, and because the interactive user interface and the video content may each be sent as its own complete video frame, video client 103 may be free to combine these in the video frame in any manner desired, including changing the relative sizes and positions of the interactive user interface and the video content within the resulting combined video frame as displayed at video display 115.

Returning to FIG. 2, in step 208 the resulting video frames output from combiner 113 are then provided to video display 115 for display to the user. Video display 115 may be implemented as, for instance, a cathode ray tube (CRT) monitor, a liquid crystal display (LCD) monitor, a plasma display, a wireless handheld or other portable device, a television set, or any other type of device capable of presenting a dynamic visual image to a user.

In step 209, any commands initiated by the user (e.g., using remote control 116) and/or initiated by video client 103 may be sent to residential gateway 101 over network 102, using network interface 114. These commands may include, for instance, commands interacting with the interactive user interface such as by moving through a menu presented by the interactive user interface and/or selecting an item from the menu. These commands may also include commands that may not necessarily be directly related to the interactive user interface. In addition, user-initiated commands may be executed locally by video client 103, rather than being sent back to residential gateway 101. For example, a command may be issued by the user, e.g., via remote control 116, to switch between combining modes. Examples of such locally-executed commands may include a command to switch between combining modes and/or a command to indicate where on the video frame the interactive user interface and/or the video content should be located relative to each other. Although step 209 is shown occurring after step 208, step 209 may occur at any time during the process performed by video client 103.

As shown in FIG. 2, each of residential gateway 101 and video client 103 may cycle through their respective processes continuously. For instance, each may perform one or more cycles per video frame.

Thus, techniques have been described for potentially making interactive user interfaces such as remote terminal user interfaces more bandwidth efficient. Although examples have been discussed in connection with an interactive user interface generated by a residential gateway and viewed by a video client, such interactions may be implemented between any two devices. For instance, a television content service provider component location, such as but not limited to a headend, may generate and compress the interactive user interface, rather than a residential gateway. And while examples have been described in connection with a video client that may be, for instance, a home television set top box, the video client may be other types of video-capable devices such as smart phones or other handheld computers.

The invention claimed is:

1. A method comprising:

receiving, by a computing device:

first data associated with an interactive user interface, and second data, different from the first data, associated with video content;

determining, by the computing device and based on receiving an indication of a configuration for outputting the interactive user interface in a location relative to the video content, output information for causing simultaneous output of both the video content and the interactive user interface, wherein the indication is received separately from the first data and from the second data; and causing, based on the first data, the second data, and the determined output information, simultaneous output via a display device of the interactive user interface with the video content.

2. The method of claim 1, further comprising:

generating a video signal that comprises the interactive user interface in a first area and the video content in a second area.

3. The method of claim 1, further comprising:

generating a video signal such that a location of the video content in a video frame of the video signal is based upon the indication of the configuration.

4. The method of claim 1, wherein the determined output information indicates at least one of a partially overlapping mode, a non-overlapping mode, or a blended mode.

5. The method of claim 1, wherein the receiving comprises:

receiving the first data separately from the second data.

6. The method of claim 1, wherein the indication of the configuration comprises an indication of a user selection of a display mode.

7. An apparatus comprising:

one or more processors; and memory storing instructions that, when executed by the one or more processors, cause the apparatus to:

receive:

first data associated with an interactive user interface, and second data, different from the first data, associated with video content;

determine, based on receiving an indication of a configuration for outputting the interactive user interface in a location relative to the video content, output information for causing simultaneous output of both the video content and the interactive user interface, wherein the indication is received separately from the first data and from the second data; and cause, based on the first data, the second data, and the determined output information, simultaneous output via a display device of the interactive user interface with the video content.

8. The apparatus of claim 7, wherein the instructions, when executed by the one or more processors, further cause the apparatus to:

generate a video signal that comprises the interactive user interface in a first area and the video content in a second area.

9. The apparatus of claim 7, wherein the instructions, when executed by the one or more processors, further cause the apparatus to:

generate a video signal such that a location of the video content in a video frame of the video signal is based upon the indication of the configuration.

10. The apparatus of claim 7, wherein the determined output information indicates at least one of a partially overlapping mode, a non-overlapping mode, or a blended mode.

11. The apparatus of claim 7, wherein the instructions, when executed by the one or more processors, cause the apparatus to:

receive by receiving the first data separately from the second data.

12. The apparatus of claim 7, wherein the indication of the configuration comprises an indication of a user selection of a display mode.

13. One or more non-transitory computer-readable media storing instructions, that when executed, cause:

receiving, by a computing device:

first data associated with an interactive user interface, and second data, different from the first data, associated with video content;

determining, by the computing device and based on receiving an indication of a configuration for outputting the interactive user interface in a location relative to the video content, output information for causing simultaneous output of both the video content and the interactive user interface, wherein the indication is received separately from the first data and from the second data; and causing, based on the first data, the second data, and the determined output information, simultaneous output via a display device of the interactive user interface with the video content.

14. The one or more non-transitory computer-readable media of claim 13, wherein the instructions, when executed, further cause:

generating a video signal that comprises the interactive user interface in a first area and the video content in a second area.

15. The one or more non-transitory computer-readable media of claim 13, wherein the instructions, when executed, further cause:

generating a video signal such that a location of the video content in a video frame of the video signal is based upon the indication of the configuration.

16. The one or more non-transitory computer-readable media of claim 13, wherein the determined output information indicates at least one of a partially overlapping mode, a non-overlapping mode, or a blended mode.

17. The one or more non-transitory computer-readable media of claim 13, wherein the instructions, when executed, cause the receiving by receiving the first data separately from the second data.

18. The one or more non-transitory computer-readable media of claim 13, wherein the indication of the configuration comprises an indication of a user selection of a display mode.

19. A system comprising:

a computing device; and a display device, wherein the computing device is configured to:

receive:

first data associated with an interactive user interface, and second data, different from the first data, associated with video content;

determine, based on receiving an indication of a configuration for outputting the interactive user interface in a location relative to the video content, output information for causing simultaneous output of both the video content and the interactive user interface, wherein the indication is received separately from the first data and from the second data; and cause, based on the first data, the second data, and the determined output information, simultaneous output via the display device of the interactive user interface with the video content, and wherein the display device is configured to:

simultaneously output the interactive user interface with the video content.

20. The system of claim 19, wherein the indication of the configuration comprises an indication of a user selection of a display mode.

* * * * *